United States Patent [19]
Cutler

[11] 3,864,613
[45] Feb. 4, 1975

[54] PATH GENERATING SYSTEM FOR NUMERICAL CONTROL APPARATUS

[76] Inventor: Hymie Cutler, 16230 Santa Rosa, Detroit, Mich. 48221

[22] Filed: Dec. 29, 1972

[21] Appl. No.: 319,317

[52] U.S. Cl............... 318/573, 318/574, 318/571, 235/151.11
[51] Int. Cl. ......................................... G05b 19/24
[58] Field of Search.................... 318/571, 573, 574; 235/151.11

[56] References Cited
UNITED STATES PATENTS

| | | | |
|---|---|---|---|
| 2,833,941 | 5/1958 | Rosenberg et al. | 318/574 X |
| 3,416,056 | 12/1968 | Motooka et al. | 318/573 |
| 3,428,792 | 2/1969 | Kelling | 318/571 X |
| 3,461,365 | 8/1969 | Newland et al. | 318/573 |
| 3,525,917 | 8/1970 | Leenhouts | 318/574 X |
| 3,585,478 | 6/1971 | Leenhouts | 318/573 |
| 3,634,667 | 1/1972 | Okamoto et al. | 318/573 X |

*Primary Examiner*—T. E. Lynch
*Attorney, Agent, or Firm*—Benjamin J. Barish

[57] ABSTRACT

Numerical control apparatus, capable of operating in the linear or circular mode, comprises a path generator system operative to generate, in response to axis command data in a program store, a train of axes command pulses to be supplied to the respective axes drives, and a velocity control system operative to compare the feedrate command data in the program store with the generated axes command pulses and to produce feed pulses controlling the path generator system. The path generator system comprises a data register for each axis, storing the command data for its respective axis from the program store, an error register, and command pulse generating means effective to generate for each feed pulse an axis command pulse for the first axis when the error register is of one sign and an axis command pulse for the second axis when the error register is zero or of the opposite sign. The apparatus further includes error register control means effective, upon the generation of each axis command pulse, to modify the error register by the amount in one of the data registers, such that the contents of the error register will always tend to approach zero.

7 Claims, 10 Drawing Figures

"INCR x"

"DECR x"

3,864,613

PATH GENERATING SYSTEM FOR NUMERICAL CONTROL APPARATUS

BACKGROUND OF THE INVENTION

The present invention relates to a path generating system for numerical control apparatus, such as machine tools, and also to the numerical control apparatus utilizing such system.

Numerical control apparatus normally include two or three mutually orthogonal axes drives (sometimes hereinafter referred to as the $x$-axis, $y$-axis, and $z$-axis drives) which are supplied with axis command pulses to produce a resultant movement of a member in accordance with a predetermined path and velocity programmed in a program store. The program store contains axes command data representing the programmed movement distances, and feedrate command data representing the programmed movement velocities. Such apparatus further includes a path generator system (sometimes referred to as a contour generating system) operative to generate, in response to the axis command data, a train of axes command pulses for each axis to be supplied to the respective drives; and a velocity control system operative to compare the feedrate command data of the program store with the generated axes command pulses and to produce feed pulses controlling the path generator system.

Systems of the foregoing type are well-known, for example as shown in U.S. Pat. Nos. 3,479,574, 3,128,374, as well as in my prior U.S. Pat. No. 3,665,499. Such systems are commonly used for controlling machine tools, but may be used in other applications where the movement of a member is to be precisely controlled, for example in drafting or inspection machines.

The common hard-wired method of generating linear and circular contours is through the use of a Digital Differential Analyzer technique, commonly called the DDA technique. This is described for example in U.S. Pat. No. 2,841,328. The DDA technique, however, is relatively slow. For example, a 3-dimensional DDA system operating in the linear mode to generate straight-line paths requires up to six arithmetic operations to produce one axis command pulse, and a 2-dimensional DDA system operating in the circular mode to generate circular arcs requires up to eight arithmetic operations to produce one axis command pulse.

BRIEF SUMMARY OF THE INVENTION

An object of the present invention is to provide an improved path generating system which is capable of producing a considerably higher output velocity than the DDA technique for the same rate of performing arithmetic operations.

A further object of the invention is to provide a path generating system which may be constructed as a compact and inexpensive unit of low power consumption and substantially free of the need for calibration.

Another object of the invention is to provide numerical control apparatus including the above path generating system.

According to the present invention, the path generating system comprises a data register for each of the controlled axes (e.g. two or three axes), each register storing the command data for its respective axis from the program store. In a 2-axis system, there is provided an error register, and command pulse generating means effective to generate, for each feed pulse, an axis command pulse for the first axis when the error register is of one sign and an axis command pulse for the second axis when the error register is zero or of the opposite sign.

The apparatus further includes error register control means effective, upon the generation of each axis command pulse, to modify the error register by the amount in one of the data registers such as to cause the contents of the error register always to approach zero.

When the apparatus is operating in the circular mode, to generate an arc, each axis command pulse causes a modification of the error register by the amount of its own axis data register. If the particular axis command pulse is generated when the error register is negative, then the error register modification for that command pulse will be an addition operation; on the other hand, if the particular axis command pulse is generated when the error register is zero or positive, then the modification will be a subtraction operation from the error register.

When the apparatus is operating in the linear mode, to generate a straight-line path, each axis command pulse causes a modification of the error register by the amount of the other (as distinguished from its own, in the circular mode) axis data register. As in the circular mode of operation, if a particular axis command pulse is generated when the error register is negative, then the error register modification for that command pulse will be an addition operation; whereas if the axis command pulse is generated when the error register is zero or positive, then the modification will be a subtraction operation.

The invention is described below in connection with two examples, namely one illustrating a single-plane (i.e. 2-axes) circular path generation wherein it will be shown that an axis command pulse is produced for each arithmetic operation involving the error register; and one illustrating a 3-dimensional (3-axes) straight-line path generation involving two error registers wherein it will be shown that an axis command pulse is produced for each two arithmetic operations involving the error registers. The system of the present invention thus provides a considerably higher output velocity than the previously mentioned DDA technique.

Also, the path generating system of the present invention is based on digital logic, is compact, inexpensive, consumes little power, and is free of calibration.

Further features and advantages of the invention will be apparent from the description below.

BRIEF DESCRIPTION OF THE DRAWINGS

The invention is herein described, somewhat diagrammatically and by way of example only, with reference to the accompanying drawings wherein.

DESCRIPTION OF THE PREFERRED EMBODIMENT

Figure 1:
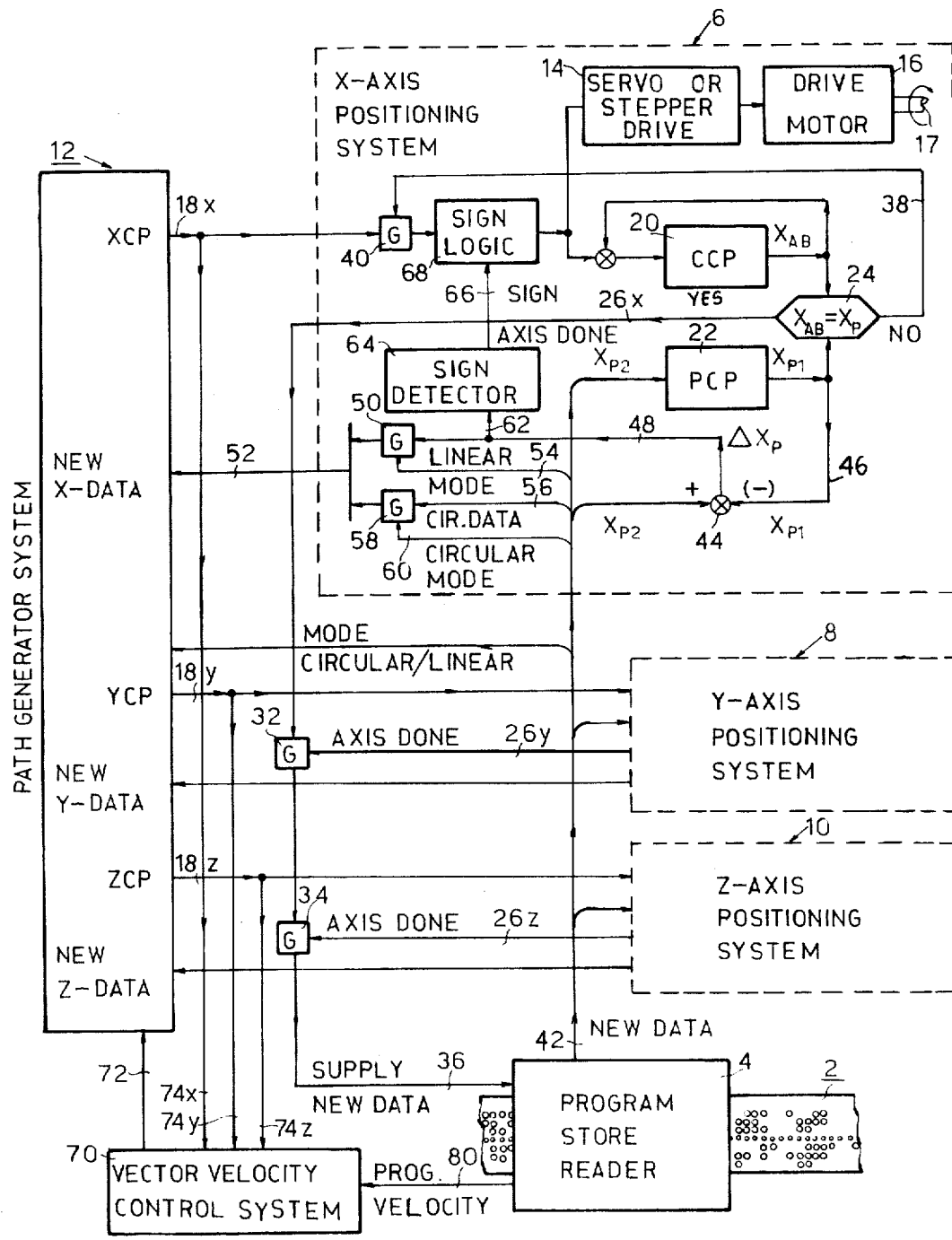
FIG. 1 is a functional block diagram illustrating a 3-axis numerical control system constructed in accordance with the present invention.

Overall System of FIG. 1

A 3-axis path generator (or contouring) system constructed in accordance with the invention and capable of operating in the linear or circular mode, is illustrated in the block diagram of FIG. 1.

Briefly, the system illustrated includes a program store 2 that supplies the data for the sequence of motions to be performed by the equipment being controlled. The data store is shown for purposes of example as being a coded punched paper tape, the data being read by a reader 4, but it will be appreciated that other forms of data stores could be used, for example, magnetic tape, MOS memories, or the like.

The system of FIG. 1 includes three axes positioning systems, namely x-axis system 6, y-axis system 8 and z-axis system 10. The details of only the x-axis positioning system are shown, it being understood that the same arrangement is used in the y-axis and z-axis systems. Each axis positioning system receives the axis command pulses (hereinafter called XCP, YCP and ZCP) produced by the path generator system 12, and through either a servo or stepper drive 14, actuates its respective axis drive motor 16 to move the axis shaft 17 the corresponding distance represented by the received pulses. The path generator 12 supplies the axis command pulses via lines 18x, 18y and 18z to the three axis positioning systems 6, 8, 10 at such coordinated rates that the resultant movement of the member (such as a machine tool) driven by the three axes drives traces the exact straight-line or circular path programmed. The steps of motion applied by the axes drives are so small and so rapidly performed that the motion is effectively smooth and continuous.

Each axis positioning system 6, 8, 10 includes a register 20, labelled CCP, storing the current commanded position ($X_{AB}$), and a second register 22 labelled CCP, storing the programmed commanded position ($X_P$). The two positions are compared in a comparator 24, and when they agree, a signal is transmitted via line 26x to halt the generation of further command pulses XCP. When the other two axes have arrived at their programmed positions, similar signals are produced in their corresponding lines 26y, 26z, which, via gates 32, 34, supply a "new data" signal to program store reader 4, to extract new data from the program store.

When the current commanded position ($X_{AB}$) as stored in the respective axis register 20 does not agree with the programmed commanded position ($X_P$) as stored in the respective axis register 22, a signal is produced from comparator 24 on line 38 to the respective axis gate 40, holding the latter gate open to receive further axis command pulses (XCP, YCP, ZCP) via line 18 of the respective axis positioning system. Thus further axis command pulses will be fed to the respective axis positioning system until there is agreement between the current and the programmed commanded position for all three axes.

In the linear mode of operation, before the motion starts the data defining the path must be supplied. That data is the delta of motion for each axis, which is the difference between the new and the last programmed commanded position. This is calculated and then routed to the path generator system 12. Thus, the new position data fed from the program store reader 4 via line 42 to register 22, is also fed to an adder 44. The previous programmed position is subtracted therefrom, via line 46, and the difference (or delta of motion) appears on line 48 and is fed, via gate 50, to the "new data" input line 52 of the path generator system 12. Gate 50 is opened by a linear mode signal fed via line 54 from the program store reader 4.

In the circular mode of operation, before the motion starts the axial components of the initial radius vector are routed via line 56 from the program store and loaded via gate 58 and the "new data" input line 52 into the path generator system. Gate 58 is opened by a circular mode signal received from the data store via line 60.

In the circular mode, the new program position is compared to the last previously programmed position to determine the direction of motion required in order to arrive to the new position. Thus the delta of motion appearing on line 48 from adder 44 is fed via line 62 to a sign detector 64 which feeds a signal representing the sign via line 66 to a sign logic device 68. The latter receives the axis command pulses via line 18 and determines the direction of rotation of the respective axis drive.

The apparatus further includes a vector velocity control system 70, which supplies feed pulses (hereinafter called FP) via line 72 to the path generator system for controlling the generation of the axis command pulses (XCP, YCP, ZCP). The velocity control system 70 receives the axis command pulses (XCP, YCP, ZCP) via lines 74x, 74y and 74z, and performs the necessary calculations so that the feed pulses on line 72 will produce a resultant velocity from the combined axis motions that will be equal to the programmed value. Various velocity control systems are known and could be used, for example that described in my prior U.S. Pat. No. 3,665,499. An improved and preferred form of velocity control systems that may be used is described in my copending U.S. Pat. application Ser. No. 319,316, filed Dec. 29, 1972.

Two examples of the construction and operation of the path generator system illustrated are described below, one example being a single-plane circular path generation system illustrated in the functional block-diagram of FIG. 2, and the other being a 3-dimension straight-line path generation system illustrated in the functional block diagram of FIG. 3.

Figure 2:
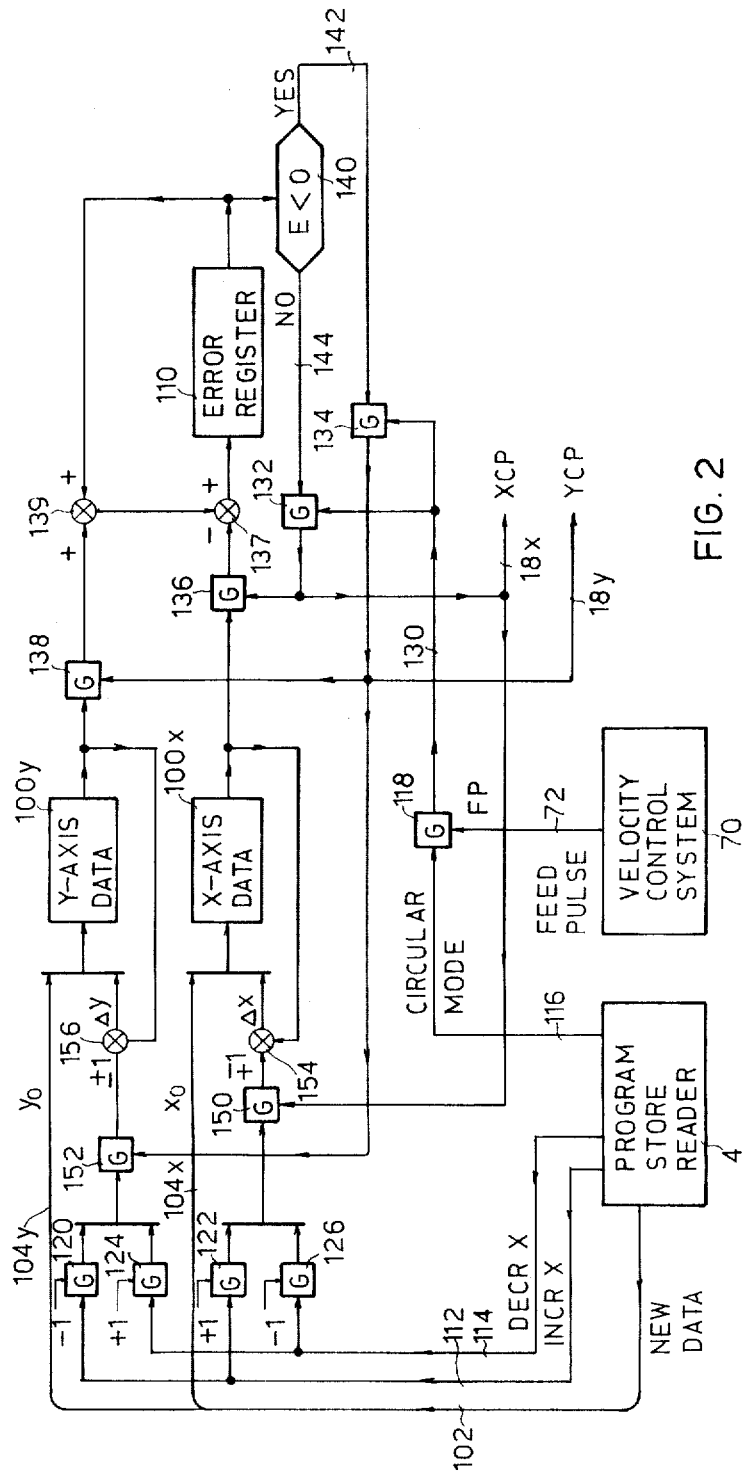
FIG. 2 is a functional block diagram illustrating the generation of a single-plane (i.e. 2-axes) circular path by the system of FIG. 1.

Single-Plane Circular Path Generator System (FIG. 2)

FIG. 2 illustrates a system for generating a circular arc lying in a plane formed by any pair of mutually orthogonal axes. The x,y-plane is shown in the block diagram of FIG. 2, but it will be appreciated that it could just as well be the x,z-plane or the y,z-plane.

As shown in FIG. 2, the output of the system illustrated is the axes command pulses XCP, YCP on lines 18x, 18y respectively. These pulses will command small incremental changes of position of their respective axes drives. The system generates the pulses in such a coordinated manner that the paths created will always lie within one pulse of the true geometric arc. These steps of motion define the resolution of the system and typically are in the order of 0.0001 inches which, being so small, result in the generation of smooth curves.

The generator system illustrated in FIG. 2 comprises data registers 100x, 100y, one for each axis, each register storing the command data for its respective axis from the program store reader 4. The latter data is fed to the respective axis registers via line 102 and 104x, 104y. The system further includes an error register 110.

Figure 2A:
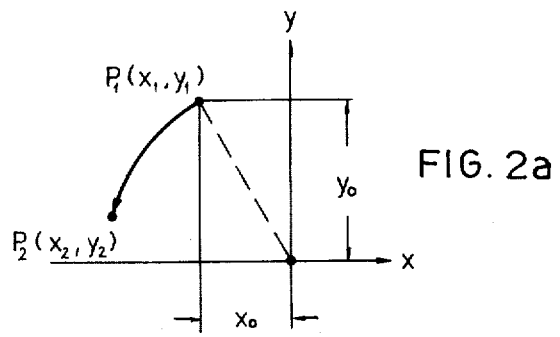
FIGS. 2a, 2b, 2c are diagrams helpful in understanding how the circular path of FIG. 2 is generated.
Figure 2B:
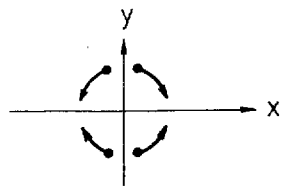
Figure 2C:
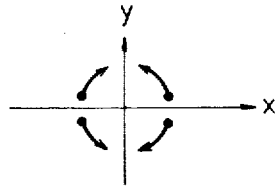

FIG. 2a illustrates a typical circular arc and the data required from the program store to define it. Point P1 is the initial position of the arc, i.e., the endpoint of the previous motion; and point P2 defines the endpoint or destination of the arc to be drawn. Points $x_o$, $y_o$ define the initial radius vector in terms of the two axial coordinates, this information being supplied from the program store, via lines 102 and 104x, 104y, to the respective axis data registers 100x, 100y. In addition the program store further supplies a command signal via line 112 to increase X, or a command signal via line 114 to decrease X, which thereby determines the direction of rotation of the arc being drawn. This for example is shown in FIGS. 2b, 2c, wherein an "Increase X" signal causes the arc to be drawn in the direction of increasing the x-axis and decreasing the y-axis (FIG. 2b); whereas a "Decrease X" signal causes the arc to be drawn in the opposite direction (FIG. 2c). The system illustrated limits the arc to a single quadrant per command, which simplifies the programming and the logic.

The program store 4 also supplies a mode signal (in this case, specifying the circular mode of operation) via line 116 to a gate 118. Applied as the second input to the gate are the feed pulses FP fed from the velocity control system 70 via line 72.

The axis command pulses XCP and YCP are mutually exclusive. That is to say, when the velocity control system 70 supplies a feed pulse via line 72, an axis command pulse will be produced, but whether it will be an XCP or a YCP pulse will depend on the sign of the contents of error register 110. If error register 110 is negative, a YCP pulse will be produced; and if the error register is zero or positive, an XCP pulse will be produced.

Each axis command pulse causes a modification of one of the data registers 100x, 100y. Accordingly, as the arc is generated, the number in one of these registers will increase while the other decreases. Which register increases will be determined by the signal appearing either on lines 112 or 114 from the program store, as described above with reference to FIGS. 2b and 2c.

Each axis command pulse will also cause the error register 110 to be modified by the amount in one of the data registers 100x, 100y, such that the contents of the error register will always tend to approach zero. If the error register is negative and a feed pulse on line 72 is present, a YCP pulse is produced, and the YCP pulse causes the data in the Y-data register 100y to be added into the error register. When the number in the error register becomes zero or positive, the generation of YCP pulses terminates, and each feed pulse on line 72 then causes an XCP pulse to be generated, which in turn causes the data in the X-data register 100x to be subtracted from that in error register 110. The XCP pulses continue to be generated until the error register again becomes negative, which causes the production of YCP pulses. The procedure so continues until the complete arc specified in the program store is drawn.

The system illustrated in FIG. 2 operates as follows:

First, the x-data and y-data registers 100x and 100y are loaded with the axial components of the initial radius vector ($x_o$, $y_o$) from the program store reader 4 via lines 102 and 104x, 104y. To determine the direction of rotation of the arc, the program store reader 4 also supplies either an "IncreaseX" signal via line 112 to a pair of gates 120,122 which causes the x-register 100x to be incremented one unit and the y-register 100y to be decremented one unit, or a "Decrease X" signal via line 114 to a pair of gates 124, 126, which causes the x-register 100x to be decremented and the y-register 100y to be incremented one unit.

As indicated earlier, the velocity control system 70, which may be one of the known designs or that described in my copending patent application referenced above, is operative to compare the feed-rate command data in the program store with the generated axes command pulses (XCP, YCP), and to produce feed pulses (FP) on line 72 to control the generation of the axis command pulses by the path generator system. Thus, with each occurrence of a feed pulse FP on line 72 from the velocity control system 70, the path generator system will produce an axis command pulse. The feed pulses FP are directed via line 72 to gate 118, such that, with each pulse FP, a pulse is produced on output line 130, assuming that the gate receives the circular mode signal from the program store via line 116. The signal on line 130 is applied to a pair of gates 132, 134 enabling the former to produce an XCP pulse, or the latter to produce a YCP pulse, depending upon the signal at the other input of the respective gates as described below.

Assuming that an XCP pulse is produced from gate 132, that pulse is applied to output line 18x, and also to a further gate 136 which, via adder 137 (acting as a subtractor), causes the contents of the x-data register 100x to be subtracted from the contents of the error register 110. On the other hand, if a YCP pulse is produced from gate 134, that pulse is applied to output line 18y, and also to another gate 138 which, via adder 139, causes the contents of the y-data register 100y to be added into error register 110.

The sign of the contents of error register 110 is continually checked by a sign detector 140. If the error register goes negative, a signal is applied via line 142 to gate 134 to open that gate and to thereby cause the generation of a YCP pulse with each subsequent FP pulse. As described above, the YCP pulse also causes the data within the y-data register 100y to be added into error register 110. When the error register becomes positive, as detected by sign detector 140, the signal on line 142 ceases, and a signal is produced on line 144 to gate 132, which causes the production of an XCP pulse with each FP pulse thereafter; this also causes the contents of the x-data register 100x to be subtracted from the contents of error register 110. An XCP pulse is then generated with each FP pulse until the error register again becomes negative, at which time the generation of XCP pulses ceases and the generation of YCP pulses starts.

With the generation of each XCP pulse and YCP pulse, the respective data registers 100x, 100y are incremented by means of gates 150,152 and adders 154,156.

The foregoing operations continue so long as the velocity control system 70 generates feed pulses FP on line 72. When the positions of the axis drives equal the programmed values, as specified in the program store, the feed pulses FP will cease, thereby terminating also the generation of XCP and YCP pulses, until "new data" is supplied.

Figure 4:
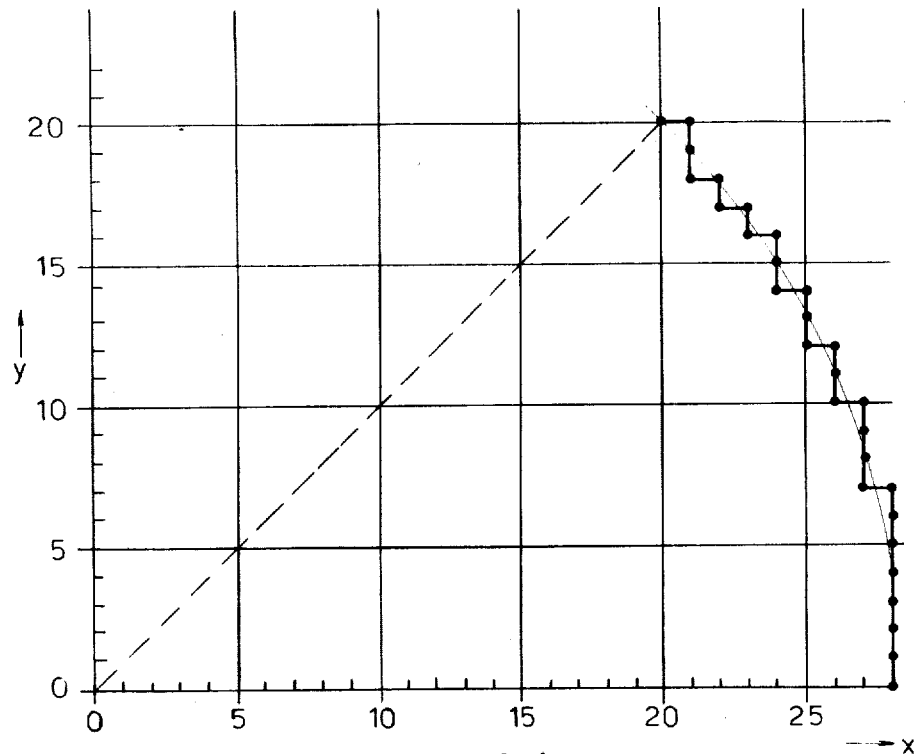
FIG. 4 is a diagram of a circular path generated by the described system.

As indicated earlier, the system described will generate pulses in such a coordinated manner that the path created will always lie within one pulse of the true geometric arc. For example, the following Table 1 illustrates an example of the sequence of pulses in the generation of a circular arc, and FIG. 4 illustrates the corresponding arc so generated:

Table 1

CIRCULAR PATH COMPUTATION OF FIG. 4

| X-AXIS | XCP | Y-AXIS | YCP | $E_i$ | CALC R | R-ERROR |
|---|---|---|---|---|---|---|
| 20 | — | 20 | — | 0 | 28.28 | 0 |
| 20 | — |    |    | −20 |    |    |
|    |    | 20 | — | 0 |    |    |
| 21 | 1 |    | 0 | −21 |    |    |
|    | 0 | 19 | 1 | −2 |    |    |
|    | 0 | 18 | 1 | +16 |    |    |
| 22 | 1 |    | 0 | −6 |    |    |
|    | 0 | 17 | 1 | +11 |    |    |
| 23 | 1 |    | 0 | −12 | 28.61 | +0.33 |
|    | 0 | 16 | 1 | +4 | 28.02 | −0.26 |
| 24 | 1 |    | 0 | −20 |    |    |
|    | 0 | 15 | 1 | −5 |    |    |
|    | 0 | 14 | 1 | +9 |    |    |
| 25 | 1 |    | 0 | −16 | 28.21 | −0.07 |
|    | 0 | 13 | 1 | −3 | 28.19 | −0.09 |
|    | 0 | 12 | 1 | +9 | 27.72 | −0.56 |
| 26 | 1 |    | 0 | −17 |    |    |
|    | 0 | 11 | 1 | −6 |    |    |
|    | 0 | 10 | 1 | +4 |    |    |
| 27 | 1 |    | 0 | −23 | 28.80 | +0.52 |
|    | 0 | 9  | 1 | −14 |    |    |
|    | 0 | 8  | 1 | −6 |    |    |
|    | 0 | 7  | 1 | +1 | 27.90 | −0.38 |
| 28 | 1 |    | 0 | −27 | 28.87 | +0.59 |
|    | 0 | 6  | 1 | −21 |    |    |
|    | 0 | 5  | 1 | −16 |    |    |
|    | 0 | 4  | 1 | −12 | 28.28 | 0 |
|    | 0 | 3  | 1 | −9 |    |    |
|    | 0 | 2  | 1 | −7 |    |    |
|    | 0 | 1  | 1 | −6 |    |    |
|    | 0 | 0  | 1 | −6 | 28.00 | −0.28 |

It will be noted that in the above-described system to generate a circular arc, an axis command pulse is produced for each arithmetic operation involving error register 110. It will be seen, therefore, that this system is substantially faster than DDA technique mentioned above, wherein up to eight arithmetic operations are required to produce one axis command pulse in the circular mode of operation.

Figure 3:
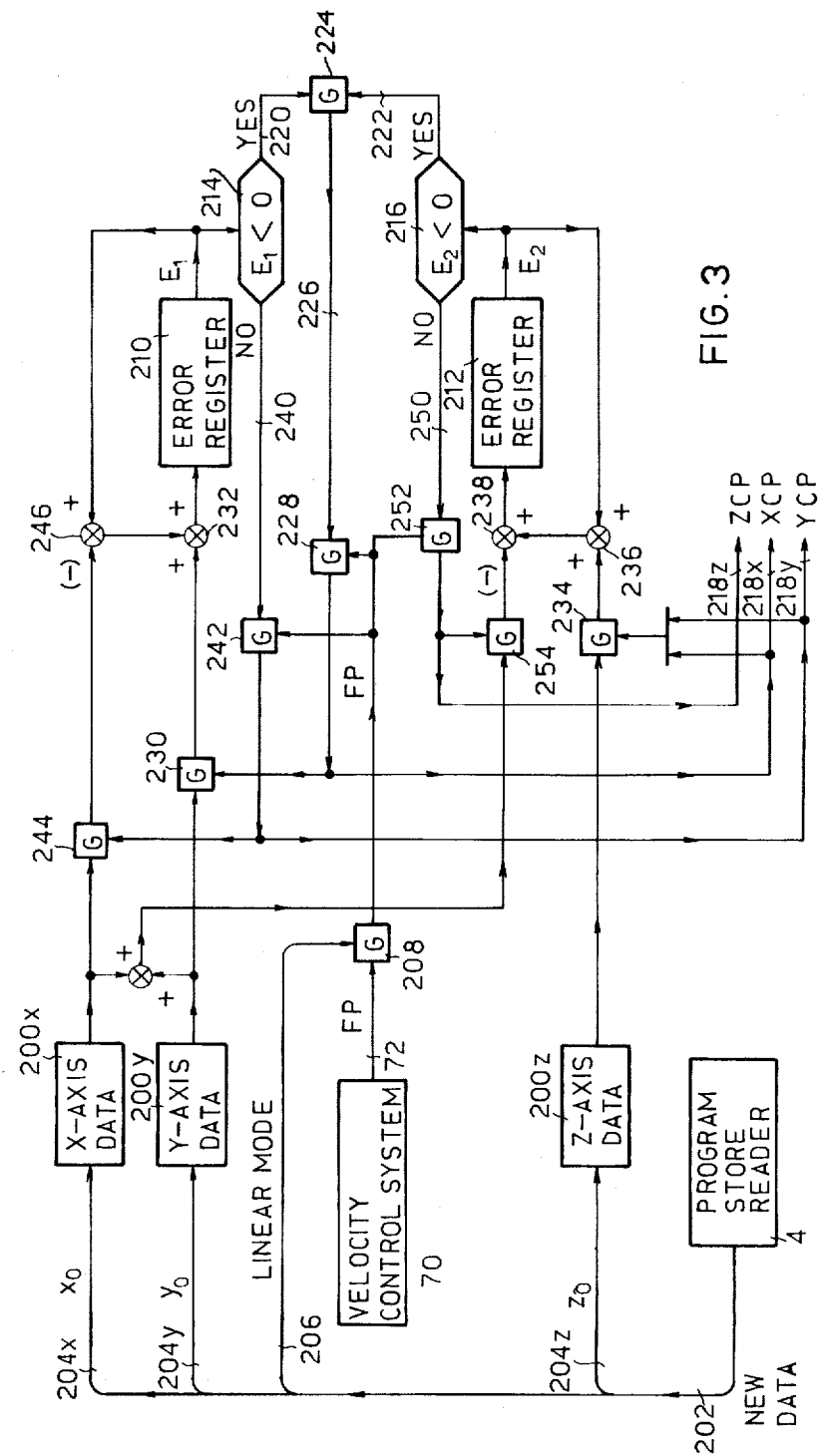
FIG. 3 is a functional block diagram illustrating the generation of a 3-dimensional (i.e. 3-axes) straight-line path by the system of FIG. 1.

3-Dimension Straight-Line Path Generator System (FIG. 3)

The 3-dimension straight-line path generator system illustrated in FIG. 3 produces axis command pulses (XCP, YCP and ZCP) for the drives of three mutually orthogonal axes. In this case there are three data registers, 200x, 200y, and 200z, one for each axis. The initial data is supplied from the program store reader 4 via lines 202 and 204x, 204y, 204z, to the respective axis data registers. In addition, the program store reader supplies a mode signal (here, a linear mode signal to generate a straight-line path) via line 206 to a gate 208, the latter gate receiving the feed pulses FP via line 72 from the velocity control system 70.

In the 3-dimensional system illustrated in FIG. 3, there are two error registers, 210 and 212. Each error register includes a sign detector 214, 216, respectively, which detect the sign of the contents of the respective register and control the generation of the axis command pulses; in addition, they control the modification of the error registers in a manner similar to that described in FIG. 2.

Thus, whenever both error registers 210 and 212 are negative, an XCP pulse is generated on output line 218x, via lines 220, 222 of the two sign detectors, gate 224, line 226 and gate 228. The generation of an XCP pulse causes the y-data register 200y to be added, via gate 230 and adder 232, into error register 210, and the contents of the z-data register 200z to be added, via gate 234 and adders 236, 238, into error register 212. Both registers will therefore tend to go positive.

When error register 210 becomes zero or positive as detected by sign detector 214, the XCP pulses will cease, and a YCP pulse will be generated via line 240 and gate 242. The generation of a YCP pulse causes the data in the x-data register 200x to be subtracted, via gate 244 and adders 246, 232 from the contents of error register 210, and further causes the data in the z-data register 200z to be added, via gate 234 and adders 236, 238, into error register 212.

When error register 212 becomes zero or positive as detected by sign detector 216, the generation of the XCP pulse will terminate, and a ZCP pulse will be generated with each FP pulse on line 72, this being effected via line 250 and gate 252. The generation of a ZCP pulse causes the data in the x-data register 200x and also the data in the y-data register 200y to be subtracted, via gate 254 and adder 238, from error register 212. Thus, the ZCP pulses will continue to be generated with each feed pulse FP until error register 212 becomes negative, then with error registers 210 and 212 both negative the system will again generate XCP pulses with each feed pulse.

Figure 5A:
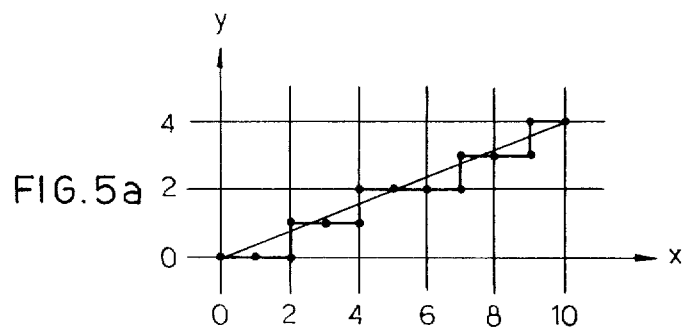
FIGS. 5a, 5b, and 5c are diagrams of a 3-dimensional straight-line path generated by the described system.
Figures 5B, 5C:
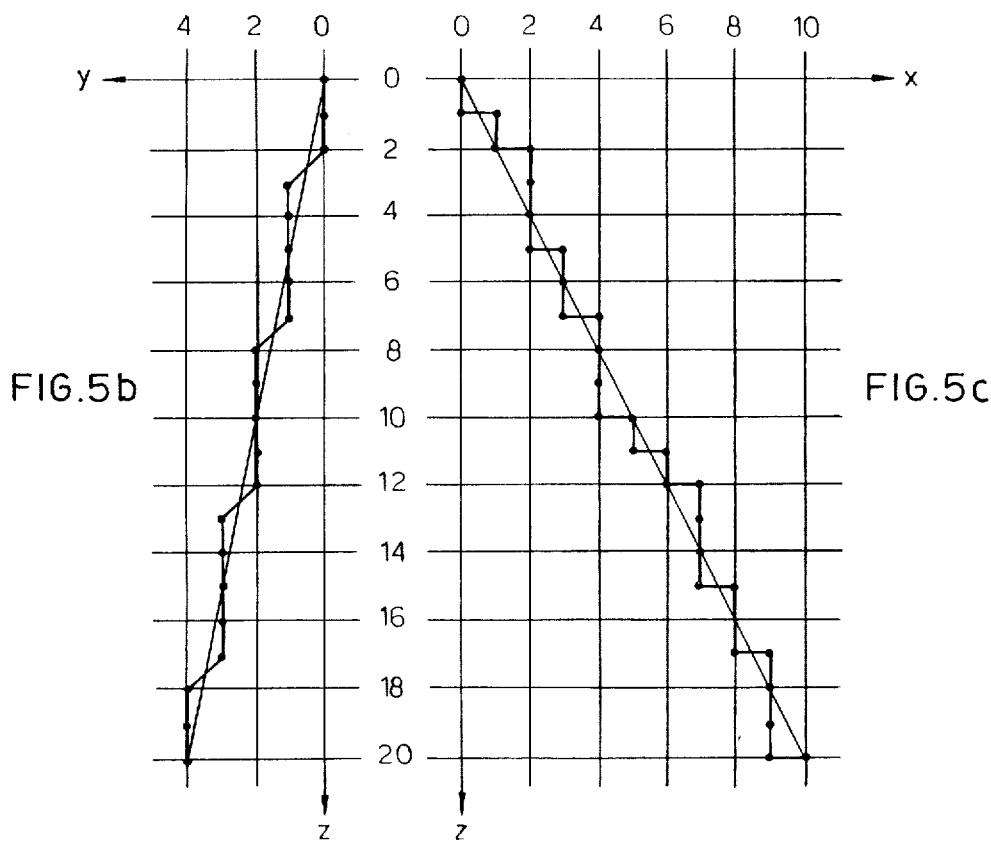

A 3-dimensional straight line path is thus traced by the axes drives. FIGS. 5a, 5b, and 5c below illustrate one example of such a path generation, and Table 2 below charts the sequence of pulses for producing it.

TABLE 2

STRAIGHT LINE PATH GENERATION OF FIG. 5

| CP | | | $E_1$ | $E_2$ | Σ | | |
|---|---|---|---|---|---|---|---|
| X | Y | Z | | | X | Y | Z |
| 0 | 0 | 0 | −6 | +6 | 0 | 0 | 0 |
| 0 | 0 | 1 | −6 | −8 |   |   | 1 |
| 1 | 0 | 0 | −2 | +12 | 1 |   |   |
| 0 | 0 | 1 | −2 | −2 |   |   | 2 |
| 1 | 0 | 0 | +2 | +18 | 2 |   |   |
| 0 | 1 | 1 | −8 | +24 |   | 1 | 3 |
| 0 | 0 | 1 | −8 | +10 |   |   | 4 |
| 0 | 0 | 1 | −8 | −4 |   |   | 5 |
| 1 | 0 | 0 | −4 | +16 | 3 |   |   |
| 0 | 0 | 1 | −4 | +2 |   |   | 6 |
| 0 | 0 | 1 | −4 | −12 |   |   | 7 |
| 1 | 0 | 0 | 0 | +8 | 4 |   |   |
| 0 | 1 | 1 | −10 | +14 |   | 2 | 8 |
| 0 | 0 | 1 | −10 | 0 |   |   | 9 |
| 0 | 0 | 1 | −10 | −14 |   |   | 10 |
| 1 | 0 | 0 | −6 | +6 | 5 |   |   |
| 0 | 0 | 1 | −6 | −8 |   |   | 11 |
| 1 | 0 | 0 | −2 | +12 | 6 |   |   |
| 0 | 0 | 1 | −2 | −2 |   |   | 12 |
| 1 | 0 | 0 | +2 | +18 | 7 |   |   |
| 0 | 1 | 1 | −8 | +24 |   | 3 | 13 |
| 0 | 1 | 1 | −8 | +10 |   |   | 14 |
| 0 | 0 | 1 | −8 | −4 |   |   | 15 |
| 1 | 0 | 0 | −4 | +16 | 8 |   |   |
| 0 | 0 | 1 | −4 | +2 |   |   | 16 |
| 0 | 0 | 1 | −4 | −12 |   |   | 17 |
| 1 | 0 | 0 | 0 | +8 | 9 |   |   |
| 0 | 1 | 1 | −10 | +14 |   | 4 | 18 |
| 0 | 0 | 1 | −10 | 0 |   |   | 19 |
| 0 | 0 | 1 | −10 | −14 |   |   | 20 |
| 1 | 0 | 0 | −6 | +6 | 10 |   |   |

As in the case of the circular line generation, the axes command pulses will be coordinated so that the path they trace will be within one pulse of the programmed straight-line. The system operating in this mode is also substantially faster than the DDA technique, since an axis command pulse is produced for each two arithmetic operations (involving error registers 210, 212), whereas in the DDA technique up to six arithmetic operations are required to produce an axis command pulse.

Many variations, modifications and other applications of the illustrated embodiments will be apparent.

What is claimed is:

1. Apparatus for generating axis command pulses to be supplied to first and second axis drives to produce a resultant circular movement of a member driven thereby in accordance with a predetermined circular path programmed in a program store, the program store including axes command data and feedrate command data, the apparatus comprising a path generator system operative to generate, in response to the program store axis command data, a train of axes command pulses for each axis to be supplied to the respective drives, and a control system operative to compare the program store feedrate command data with the generated axes command pulses and to produce feed pulses controlling the path generator system; said path generator system comprising: a data register for each of said axes, each register storing the command data for its respective axis from the program store; an error register; command pulse generating means effective to generate, for each feed pulse, an axis command pulse for said first axis when the error register is of one sign and an axis command pulse for said second axis when the error register is zero or of the opposite sign; and error register control means effective, upon the generation of each axis command pulse, to cause only the contents of the axis data register corresponding to the axis of the command pulse generated to be added into the error register when the error register is of said one sign and to be subtracted from the error register when the error register is of said opposite sign or zero, such as to cause the contents of the error register always to approach zero.

2. Apparatus as defined in claim 1, wherein, said error register control means is effective, upon the generation of each axis command pulse, to cause the data in its own axis data register to be added into the error register when the error register is negative and to be subtracted from the error register when the error register is positive or zero.

3. Apparatus as defined in claim 2, wherein the program store further includes data specifying the direction of rotation of the generated path, said path generator system further comprising: means for adding the command data of the first axis into its respective data register and for subtracting the command data of its second axis from its respective data register when one direction of rotation is specified; and means for subtracting the command data of the first axis from its respective data register and for adding the command data of the second axis into its respective data register when the opposite direction of rotation is specified.

4. Apparatus as defined in claim 1 further including means to enable operation in the linear mode, said error register control means including means effective, upon the generation of each axis command pulse, to cause the data in the other axis data register to be added into the error register when the error register is negative, and to be subtracted from the error register when the error register is positive or zero.

5. Apparatus as defined in claim 4, the apparatus generating command pulses to be supplied also to a third-axis drive, said apparatus further including a second error register, said command pulse generating means being effective to generate, for each feed pulse, a first-axis command pulse when both of the error registers are negative, a second-axis command pulse when the first-mentioned error register is zero or positive, and a third-axis command pulse when the second-mentioned error register is zero or positive; said error register control means being effective: upon the generation of each first-axis command pulse, to add the second-axis data into the first-mentioned error register and the third-axis data into the second-mentioned error register; upon the generation of each second-axis control pulse, to subtract the first-axis data from the first-mentioned error register and to add the third-axis data into the second-mentioned error register; and upon the generation of each third-axis command pulse, to subtract the first-axis data and the second-axis data from the second-mentioned error register.

6. Numerical control equipment comprising apparatus for generating axes command pulses as defined in claim 1, an input medium receiving said program store in coded form, and at least two drives having mutually orthogonal axes of motion controlled by the generated axes command pulses to produce a resultant circular movement of the member driven by the drives in accordance with the path and feedrate programmed in the program store.

7. Apparatus for generating axis command pulses to be supplied to first and second axes drives to produce a resultant movement of a member driven thereby in accordance with a predetermined straight line or circular path and velocity programmed in a program store; the program store including: mode command data specifying a straight line or circular mode of path generation, axes command data specifying the programmed axis distances, and feedrate command data specifying the programmed vector velocities; the apparatus comprising a path generator system operative to generate, in response to the program store axis command data, a train of axes command pulses for each axis to be supplied to the respective drives, and a velocity control system operative to compare the program store feedrate command data with the generated axes command pulses and to produce feedrate pulses controlling the path generator system; said path generator system comprising: a data register for each of said axes, each register storing the command data for its respective axis from the program store; an error register; command pulse generating means effective to generate, for each feed pulse, an axis command pulse for said first axis when the error register is of one sign, and an axis command pulse for said second axis when the error register is of the opposite sign or zero; mode selection means receiving the mode command data and enabling operation in accordance with a circular mode or in accordance with a linear mode; and error register control means effective, upon the generation of each command pulse for said first axis while the apparatus is operating in accordance with the linear mode, to cause the data in the other axis data register to be added into the error register when the error register is of said one sign and to be subtracted from the error register when the error register is of said opposite sign or zero; said error register control means being effective, upon the generation of each command pulse for said first axis while the apparatus is operating in accordance with the circular mode, to cause the data in its own axis data register to be added into the error register when the error register is of said one sign and to be subtracted from the error register when the error register is of said opposite sign or zero, such as to cause the contents of the error register always to approach zero.

* * * * *